US012797267B2

(12) United States Patent
Phelan

(10) Patent No.: US 12,797,267 B2
(45) Date of Patent: Nov. 17, 2026

(54) ACCESS PLATFORM

(71) Applicant: Robbie Phelan, Doreen (AU)

(72) Inventor: Robbie Phelan, Doreen (AU)

( * ) Notice: Subject to any disclaimer, the term of this patent is extended or adjusted under 35 U.S.C. 154(b) by 484 days.

(21) Appl. No.: 18/286,746

(22) PCT Filed: Apr. 16, 2022

(86) PCT No.: PCT/AU2022/050349
§ 371 (c)(1),
(2) Date: Oct. 12, 2023

(87) PCT Pub. No.: WO2022/217324
PCT Pub. Date: Oct. 20, 2022

(65) Prior Publication Data

US 2024/0197549 A1 Jun. 20, 2024

(30) Foreign Application Priority Data

Apr. 16, 2021 (AU) ................................ 2021901121
Mar. 18, 2022 (AU) ................................ 2022900674

(51) Int. Cl.
*A61G 3/06* (2006.01)
*B61B 1/02* (2006.01)

(52) U.S. Cl.
CPC ................ *A61G 3/061* (2013.01); *B61B 1/02* (2013.01); *A61G 2220/12* (2013.01)

(58) Field of Classification Search
CPC ....... A61G 3/061; A61G 2220/12; B61B 1/02
USPC .................................................. 14/69.5–72.5
See application file for complete search history.

(56) References Cited

U.S. PATENT DOCUMENTS

| | | | | | |
|---|---|---|---|---|---|
| 4,576,539 | A * | 3/1986 | Williams | A61G 3/063 | 414/921 |
| 5,444,885 | A * | 8/1995 | Hanrahan | E01F 1/00 | 14/71.1 |
| 6,081,954 | A * | 7/2000 | Palmersheim | B65G 69/2829 | 14/71.1 |
| 6,122,789 | A * | 9/2000 | Stephenson | B64F 1/3055 | 14/71.1 |
| 6,190,106 | B1 * | 2/2001 | Richardson | E02F 9/003 | 414/537 |
| 6,724,314 | B2 * | 4/2004 | Hutton | B64F 1/3055 | 700/71 |
| 6,880,301 | B2 * | 4/2005 | Hahn | B65G 69/2888 | 14/71.1 |
| 7,131,160 | B2 * | 11/2006 | Alexander | B65G 69/2835 | 14/71.3 |
| 8,590,087 | B2 * | 11/2013 | Swessel | B65G 69/2882 | 14/71.3 |

(Continued)

FOREIGN PATENT DOCUMENTS

| | | | | |
|---|---|---|---|---|
| GB | 2446196 A * | 8/2008 | H04W 16/10 |
| WO | WO-2021056081 A1 * | 4/2021 | B65G 69/30 |

*Primary Examiner* — Raymond W Addie
(74) *Attorney, Agent, or Firm* — Justin Lampel

(57) ABSTRACT

An access system for providing passenger access to rolling stock at a designated stopping station, comprising: a dedicated zone for receiving the passenger, the dedicated zone being elevated above a ground surface; a ramp mounted within the dedicated zone and actuable to project from the dedicated zone in both a lateral and a vertical manner to bridge a gap between the dedicated zone and the rolling stock to facilitate access of the passenger to the rolling stock.

18 Claims, 7 Drawing Sheets

(56) References Cited

U.S. PATENT DOCUMENTS

| | | | | |
|---|---|---|---|---|
| 8,806,689 | B2 * | 8/2014 | Riviere | E01F 9/571 404/11 |
| 8,869,331 | B2 * | 10/2014 | Pegot-Ogier | B65F 1/0033 108/25 |
| 8,869,332 | B1 * | 10/2014 | Leum | B65G 69/30 14/69.5 |
| 2006/0245828 | A1 * | 11/2006 | Jonasz | E01F 9/529 404/15 |
| 2009/0016817 | A1 * | 1/2009 | Kulhawe | E04F 15/105 404/38 |
| 2023/0293365 | A1 * | 9/2023 | Cociuban | A61G 3/061 14/71.3 |
| 2025/0241806 | A1 * | 7/2025 | Phelan | A61G 3/063 |

* cited by examiner

ACCESS PLATFORM

RELATED APPLICATIONS

The present application claims priority from earlier filed Australian Provisional Patent Application No. 2021901121 filed 16 Apr. 2021 and Australian Provisional Patent Application No. 2022900674 filed 18 Mar. 2022, the entire contents of which are incorporated herein by reference.

FIELD OF INVENTION

The present invention relates generally to an access system for a vehicle, and in particular to an access platform for accessing a rail-based vehicle by way of a ramp.

BACKGROUND OF THE INVENTION

Railway stations and tram stops have long been designed to provide safe access for individuals to board a train or similar rolling stock. Railway stations generally provide platforms that are elevated above the rail line such that when the train arrives at the platform, an individual can simply step into the carriage, through the carriage door, without having to perform a climbing motion. The edge of the platform is positioned as close as possible to minimise any gap between the platform and the train when the train is positioned at the platform, which may prove an obstacle to the passenger boarding the carriage.

Whilst train platform design has proven effective in improving passenger access to a carriage of a train, the existence of the gap between the edge of the platform and variations in heights of trains travelling on the rails, has proven difficult for passengers who may be using a pram, or in a wheelchair or similar mobility assistive device. Typically, such wheeled devices are unable to negotiate the gap between the platform and the carriage and such individuals are often reliant upon the manual placement of a ramp or similar bridging device between the platform and the carriage to access the train.

In current situations, passengers requiring assistance to board the train, typically those individuals who are in a wheelchair or mobility scooter or with a pram, generally position themselves at the end of the platform adjacent where the front carriage will stop. The driver is then able to identify the need to provide assistance to the individual, and will then leave the vehicle and install a manual ramp bridging the platform and the carriage, to enable the passenger to board the carriage. Typically the driver will store one or more mobile ramps in the driving carriage for ready access as required.

It will be appreciated that such a system for controlled access to the train requires a considerable degree of communication between the driver and the passenger, to enable the driver to identify that their assistance is required by the passenger. This may be difficult for the driver to do in crowded or peak periods of travel. Such a manual task also has a risk of causing injury to the driver during installing and removing the ramp. Further, as the driver must leave their cabin, the time taken to engage and disengage the ramp and return to the cabin and controls can cause delays to travel time depending on the frequency of the need to provide such assistance. Such a requirement also draws unwanted attention to the individual seeking the assistance which can create a stigma for such passengers that can have a negative impact on the travelling experience and their likelihood to continue to use the service.

Thus, there is a need to provide a access system for a platform that can be used by those requiring ramp access to the train that removes the need for driver assistance and provides a simple and automated means for accessing the carriage of a train.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided an access system for providing passenger access to rolling stock at a designated stopping station, comprising:

- a dedicated zone for receiving the passenger, the dedicated zone being elevated above a ground surface;
- a ramp mounted within the dedicated zone and actuable to project from the dedicated zone in both a lateral and a vertical manner to bridge a gap between the dedicated zone and the rolling stock to facilitate access of the passenger to the rolling stock.

The dedicated zone may have an elevated floor mounted upon a surface of the designated stopping station such that an edge of the elevated floor is located adjacent an edge of the designated stopping station.

The access system may further comprising a controller mounted within the dedicated zone, the controller may have a receiver for receiving data identifying rolling stock approaching the designated stopping station.

The controller may be configured to control the lateral and vertical extension of the ramp from the dedicated zone in accordance with the requirements of the identified rolling stock.

The lateral of extension of the ramp may be controlled by one or more linear actuators mounted within the dedicated zone and attached to a rear of the ramp. The vertical extension of the ramp may be controlled by controlling rotational orientation of a cam member mounted beneath the ramp.

The dedicated zone may be positioned between barriers. The barriers may comprise a lighting system controlled by the controller to provide a visual indication of the presence of the rolling stock at the designated stopping station.

In one embodiment, the designated stopping station is a train platform.

In another embodiment the designated stopping station is a tram stop.

In accordance with another aspect, there is provided a method of providing passenger access to rolling stock at a designated stopping station, comprising: detecting the rolling stock approaching the designated stopping station; identifying the rolling stock and the access requirements for that rolling stock; and activating a ramp to extend from the designated stopping station to engage with the identified rolling stock to facilitate access of passengers to the rolling stock.

The step of detecting the rolling stock approaching the designated stopping station may comprise sensing the presence of the rolling stock travelling along the rail.

The step of identifying the rolling stock may comprise sensing an identification code transmitted by the rolling stock approaching the dedicated stopping station.

The step of identifying the rolling stock may also comprise determining the access requirements of the rolling stock. The access requirements may include data identifying a position of entry doors of the rolling stock and/or data identifying a height of the entry doors of the rolling stock.

The step of activating the ramp may comprise controlling a vertical and lateral extension of the ramp to accommodate the position and/or height of the entry door of the rolling stock

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to the accessibility of a wheel-chair passenger to a carriage of a train. However, it will be appreciated that the system of the present invention could be used by a variety of different passengers requiring ramp access to a carriage of a train, tram or similar passenger vehicle, including passengers in mobility scooters and passengers with prams or other wheeled contrivances.

Figure 1:
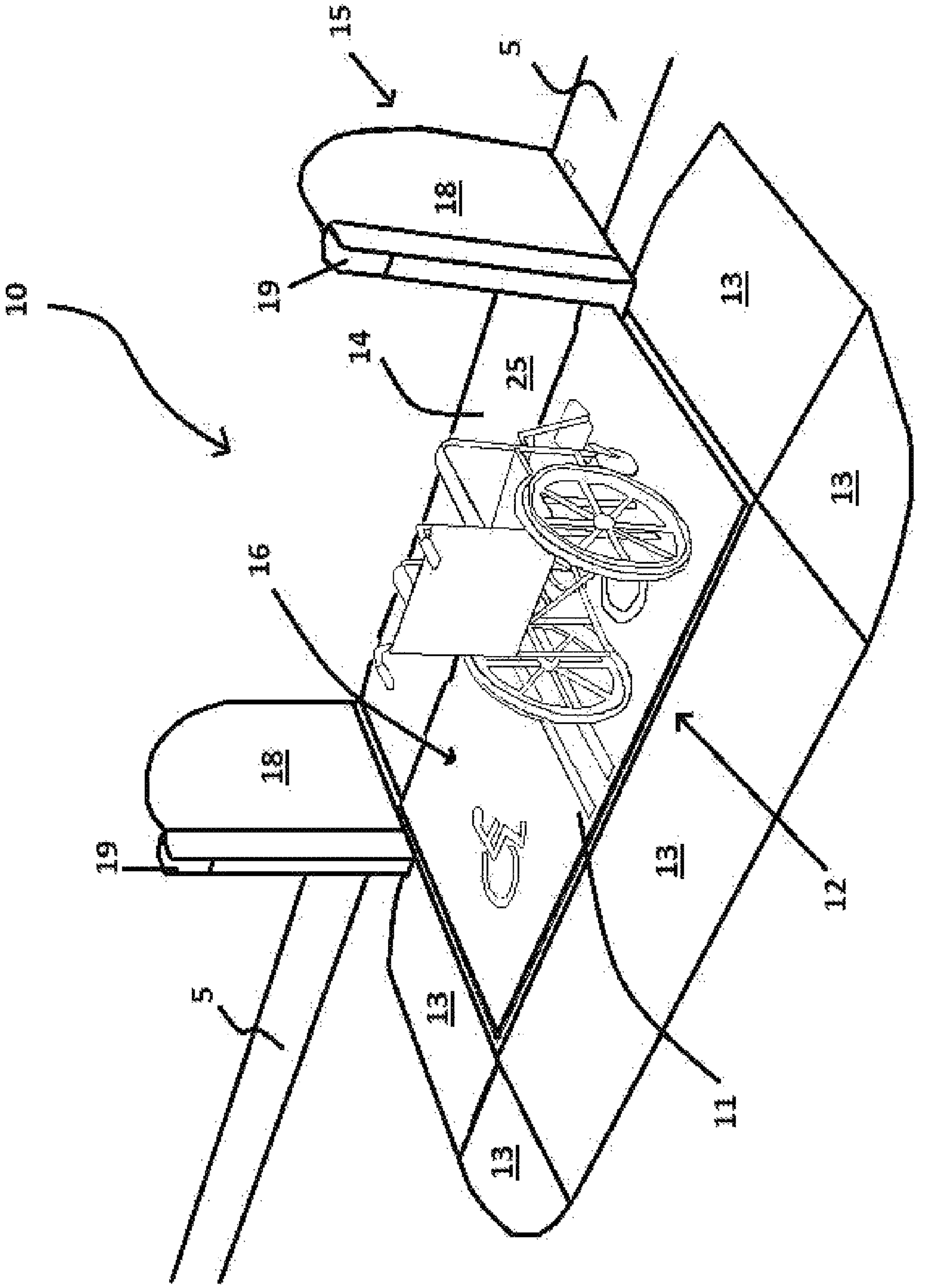
FIG. 1 is a perspective view of a platform access system in accordance with an embodiment of the present invention.

Referring to FIG. 1, a platform access system 10 in accordance with an embodiment of the present invention is depicted. The system 10 is configured to be installed on a surface of an existing platform 5, to provide a dedicated location for wheelchair passengers to access the train carriage, in a manner to be described in more detail below.

The system 10 comprises a raised floor 12 that extends from an edge of the platform 5 to define a substantially flat surface. The raised floor 12 comprises a front portion 14 that is located adjacent the edge of the platform 5 to be positioned proximal to the train when the train stops at the platform. The raised floor 12 also comprises a rear portion 16 located behind the front portion 14 that defines a surface upon which the passenger can safely wait in their wheelchair for the train to arrive, as is shown in FIG. 1.

A pair of barriers 15 are provided along opposing edges of the front portion 14 of the raised floor 12. The barriers 15 project vertically from the edges of the front portion 14 to provide a defined space between which the passengers may embark/disembark the train at the platform 5. In the embodiment as depicted in FIG. 1, the barriers 15 comprise a vertical post member 17 and a screen 18 that projects from a front face of the post member 17 to terminate adjacent the front edge of the platform 5. The screen 18 may be formed from a plastic material, such as Perspex®, such that it is see-through to maximise visibility about the system 10. Lighting 19 may be provided on an upper region of the post members 17, which is controllable to provide a visual indication of the presence of a train in the immediate vicinity of the system 10.

To provide access to the raised floor 12, graduated floor members 13 are positioned about the rear portion 16 of the raised floor 12. The graduated floor members 13 provide an inclined surface to transition from the surface of the platform 5 to the raised floor 12 of the platform access system 10. Such a transition ensures wheelchair access to the raised floor 12 as required.

The upper surface of the rear portion 16 of the raised floor 12 is provided with a signage panel 11, as shown. The signage panel 11 is removably mounted to the surface of the rear portion 16 of the raised floor and may contain any variety of signage to indicate that the platform access system 10 is for wheel chair or mobility impaired passengers use. It will be appreciated that other such signage may also be displayed on the signage panel as required from time to time.

It will be appreciated that the platform access system 10 depicted in FIG. 1 may take a variety of different forms, as depicted in FIGS. 2-5.

Figure 2:
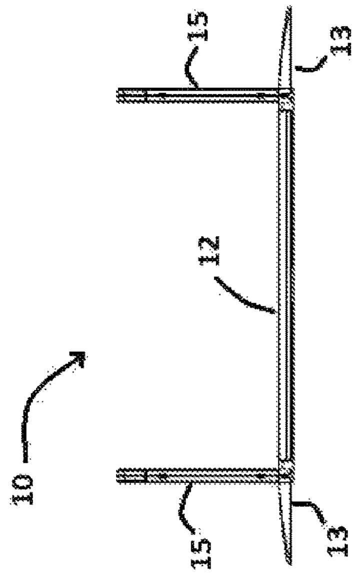
FIGS. 2-5 show front views of various embodiments of the platform access system of the present invention.
Figure 3:
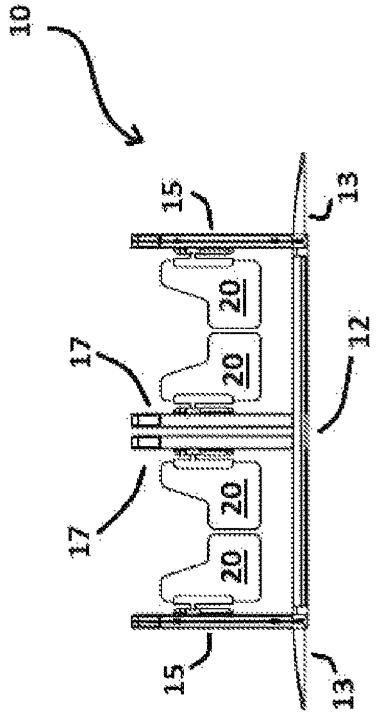
Figure 4:
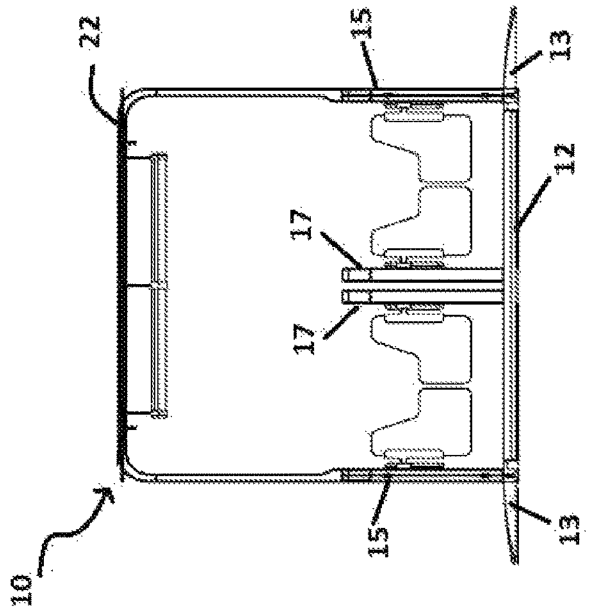
Figure 5:
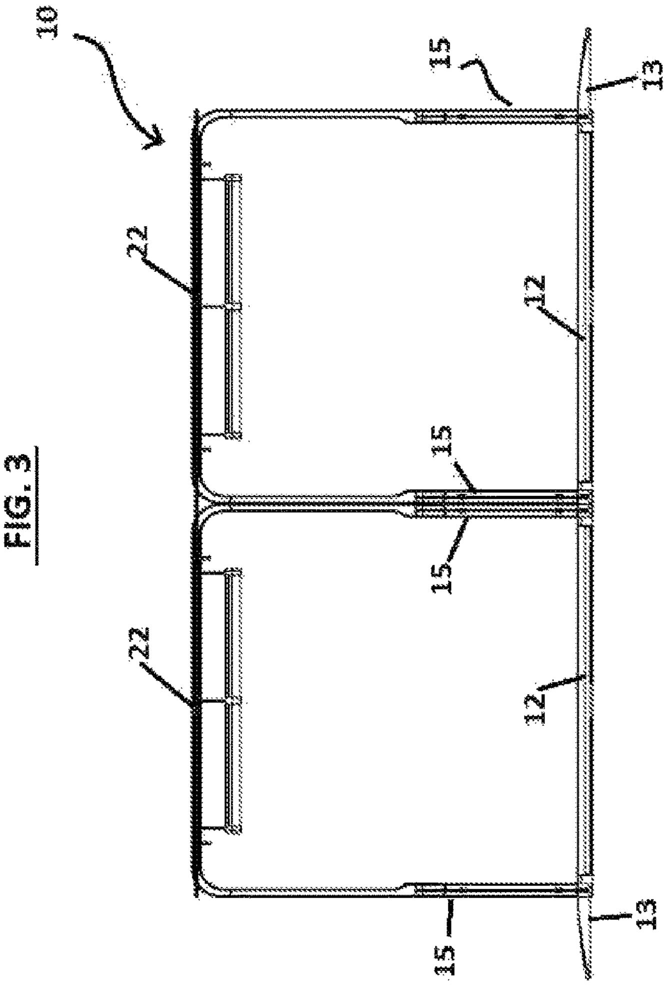

FIG. 2 shows the depiction of FIG. 1 whereby the platform access system 10 is provided between two barriers 15 spaced apart to define the entry/exit point for the carriage. FIG. 3 depicts a variation of the platform access system 10 whereby the system is defined between two barriers 15, with gates 20 installed between the posts of the barriers 15 and central posts 17. The gates 20 may be controlled by the system 10 to open/close when the train arrives at the platform for added safety. In FIG. 4, the platform access system 10 comprises gates 20 in combination with an overhead canopy 22, which may provide shelter to passengers as they are positioned at the platform access system 10. The canopy may be powered by way of mains electricity or a renewable energy source to provide lighting and/or heating to further enhance the comfort of the passengers. FIG. 5 depicts a double platform access system 10 arrangement having a dual canopy 22.

Figure 6:
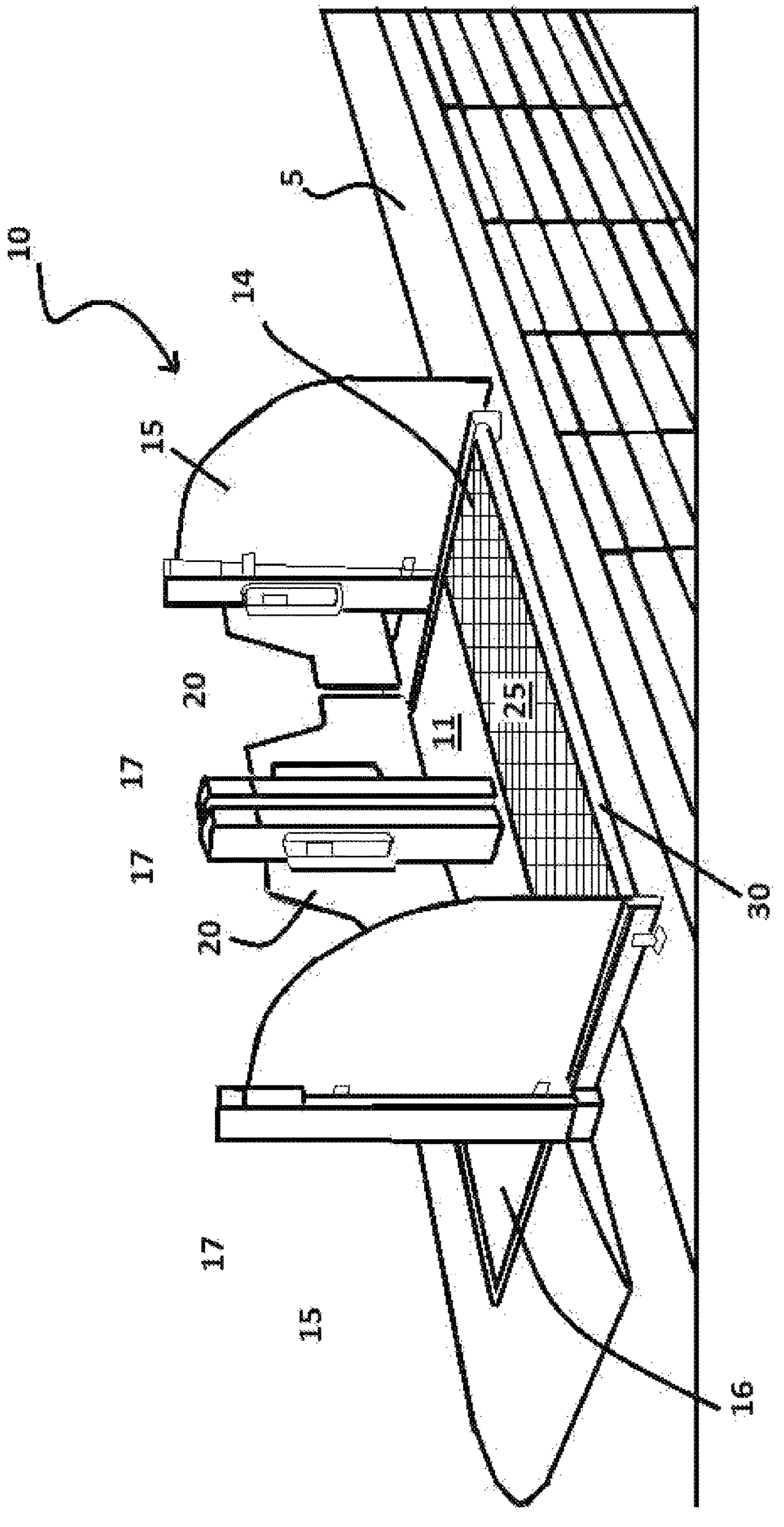
FIG. 6 is a front perspective view of a platform access system of the present invention with the ramp in the retracted position.

Referring to FIG. 6 a front perspective view of a platform access system 10 of the present invention employing gates 20 is depicted. As is shown, the front edge of the front portion 14 of the raised floor 12 terminates at, or immediately before, the edge of the platform 5. The upper surface 25 of the front portion 14 has a surface treated layer to avoid slippage during use of the platform access system 10 by both abled and disabled passengers. Immediately below the upper surface 25 of the front portion 14 is a space that houses an extendible ramp 30, which is shown in its non-extended position. In the non-extended position, the ramp 30 is retained within the perimeter of the raised floor 12 and the platform access system 10 does not extend beyond the edge of the platform 5 as shown in FIG. 6.

Figure 7:
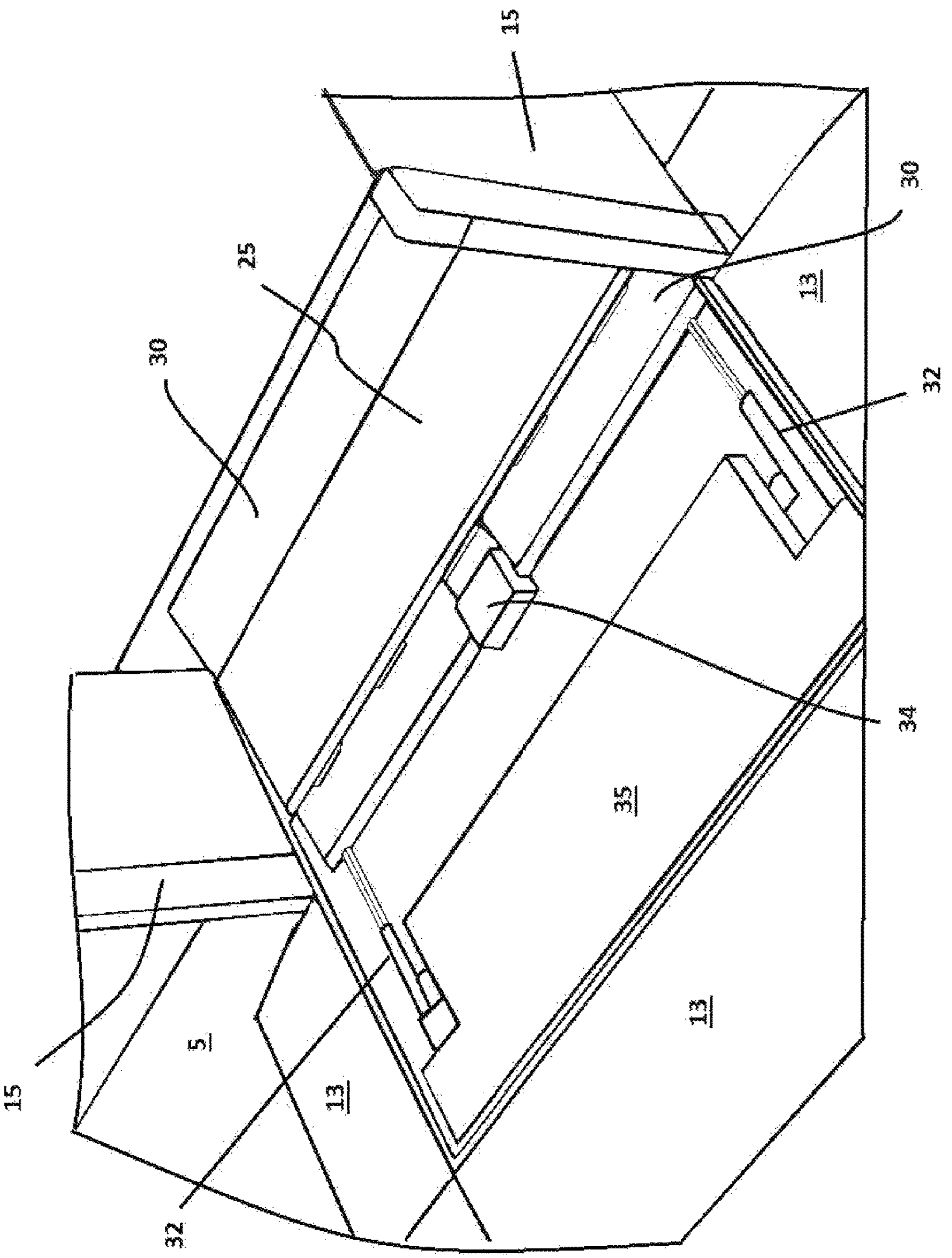
FIG. 7 is an enlarged view of the platform access system showing the activation system for the ramp extension.

The platform access system 10 is shown in FIG. 7 with the signage panel 11 removed. A control box 35 is positioned within the raised floor 12 which houses a controller together with RFID circuitry. The controller is in the form of a computing system having a CPU and related circuitry to control the operation of the platform access system 10, including the timing and activation/deactivation of the ramp 30 as well as activation/deactivation of warning lights and other components. The controller is connected to power and synchronised with the rolling stock fleet through a Radio Frequency ID (RFID). In this regard, each type of rolling stock (train) that travels through the station will have an RFID tag, which will be sensed by the controller as it is approaching. By obtaining this reading, the controller of the platform access system 10 is able to determine the type of train that is approaching the platform 5, as well as the floor height of the carriages with respect to the platform, and the gap between the carriage and the edge of the platform 5. Depending on the network, there may be different types of rolling stock that have different door spacings, different floor heights and different widths which effect the manner in which the controller must control the extension length and height of extension of the ramp 30.

The manner in which the controller activates and deactivates the ramp 30 can be seen in FIG. 7. The controller is able to control a pair of linear actuators 32 also mounted within the raised floor 12. Each of the linear actuators is connected at one end to the end of the ramp 30 such that upon activation of the linear actuators the actuator arms are caused to extend from the body of the linear actuator, to apply a pushing force against the end of the ramp 30. This pushing force causes the ramp 30 to project beyond the end of the front portion 14 of the raised floor 12 and against the door of the carriage of the train when the train arrives at the platform, as is shown in FIG. 7. The controller is able to control the degree of extension of the ramp 30 to accommodate the sensed train as it approaches the platform. The linear actuators 32 can then be controlled by the controller to retract, thereby retracting the ramp 30 back within the end of the front portion 14 of the raised floor 12.

The linear actuators are configured to connect with the end of the ramp 30 along opposing sides thereof. In order to ensure controlled movement of the ramp 30 under the pushing and pulling force of the linear actuators 32, a stabilising block 34 is provided within a central recess of the ramp 30. The stabiliser block 34 functions to ensure that both ends of the ramp 30 move by the same amount to prevent the linear actuators becoming stuck.

Figure 9:
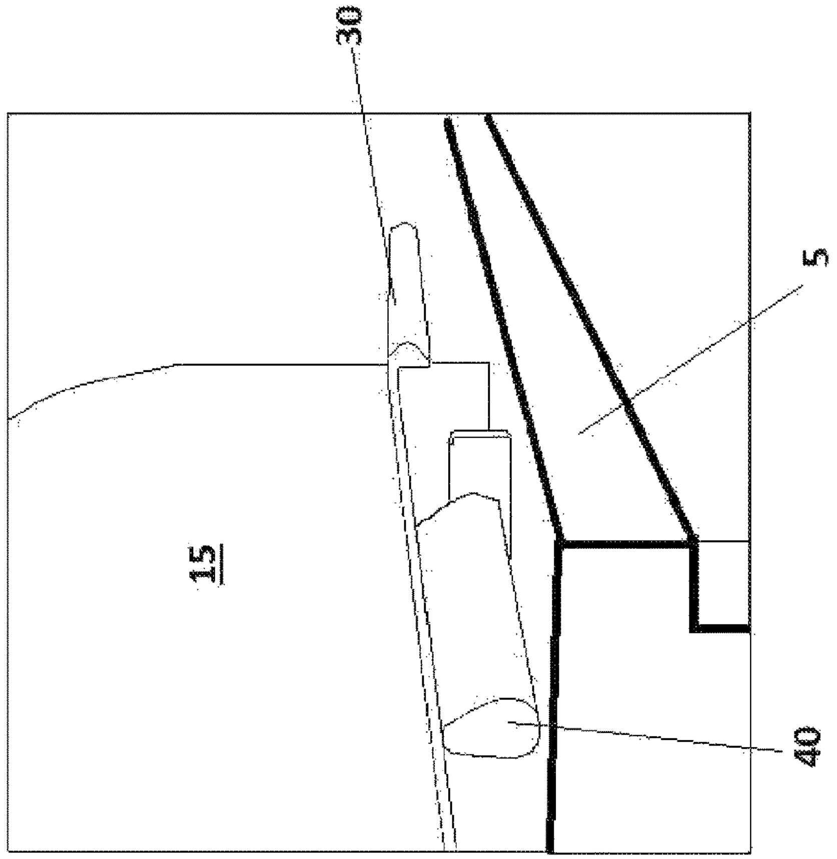
FIG. 9 a sectional side view showing the ramp elevation system of the present invention in an activated state.
Figure 8:
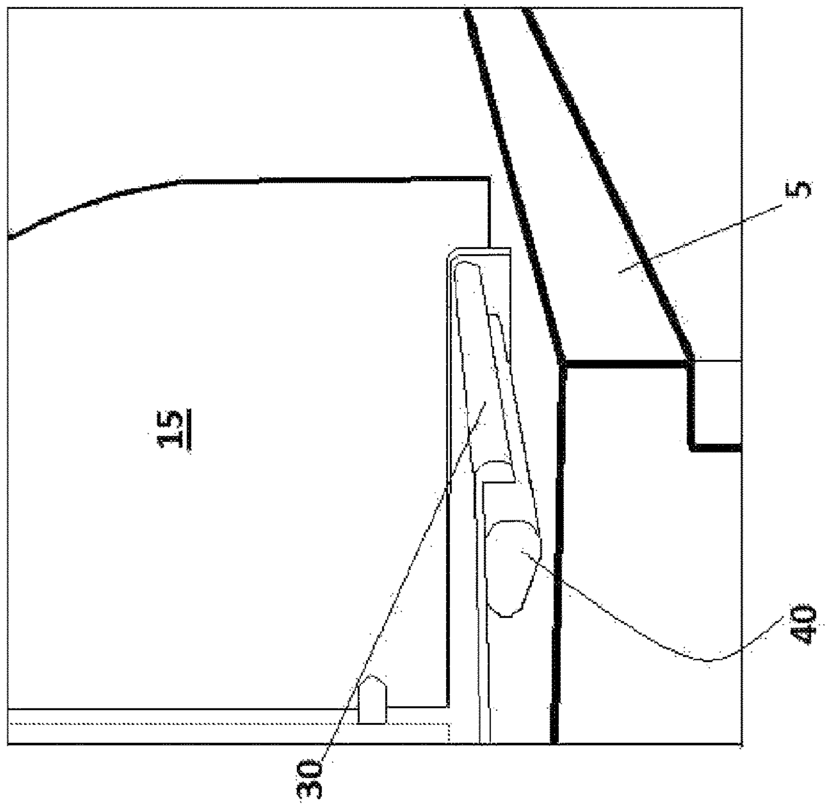
FIG. 8 is a sectional side view showing the ramp elevation system of the present invention in an inactivated state.

The manner in which the height of the ramp extension is controlled by the controller is depicted in FIGS. 8 and 9. To cause the ramp 30 to extend angularly in an upward manner, a cam member 40 is provided under the ramp 30, adjacent the end of the front portion 14 of the raised floor 12. The degree of rotation of the cam member 40 is controlled by the controller housed in the controller box 35.

Depending upon the type of rolling stock (train) sensed by the RFID sensor, the controller applies rotation to the cam member 40 moving the cam member 40 between a substantially flat position where negligible angular elevation is achieved, to a fully upright position where maximum angular elevation is achieved. In this regard, by moving the cam member 40 into the correct orientation, the controller can advance the ramp 30 by activating the linear actuators to cause the ramp 30 to advance in an elevated manner as depicted in FIG. 9. The ramp is then able to bridge the gap between the platform 5 and the train and provide the desired degree of elevation of the ramp 30 to accommodate the floor height of the train to ensure a smooth path between the platform and the train carriage for the passenger.

It will be appreciated that the platform access system 10 of the present invention will provide a wheelchair accessibility ramp that will function to close the gap and meet the requirements to accommodate the type of train that is approaching the platform. By providing control of not only the length of ramp extension but also the height of ramp extension, the system is able to automatically adjust for different types of trains approaching the platform. Such a system no longer requires communication between a train driver and person boarding, which can be difficult to coordinate, especially at crowded platforms. The present system also obviates the need for manual labour from the train driver to manually install and remove the ramp for use, which can be a cause of workplace injuries. By sensing the type of train approaching the platform and automatically activating the ramp to accommodate the train, the driver no longer has to leave the cabin and any 'dwell time' (the time between when the train arrives to when the train departs) is drastically reduced, minimising delays down the line. The present system also removes any stigma experience by passengers that have previously required driver assistance to board the train, treating mobility impaired commuters like any other passenger.

Figure 10:
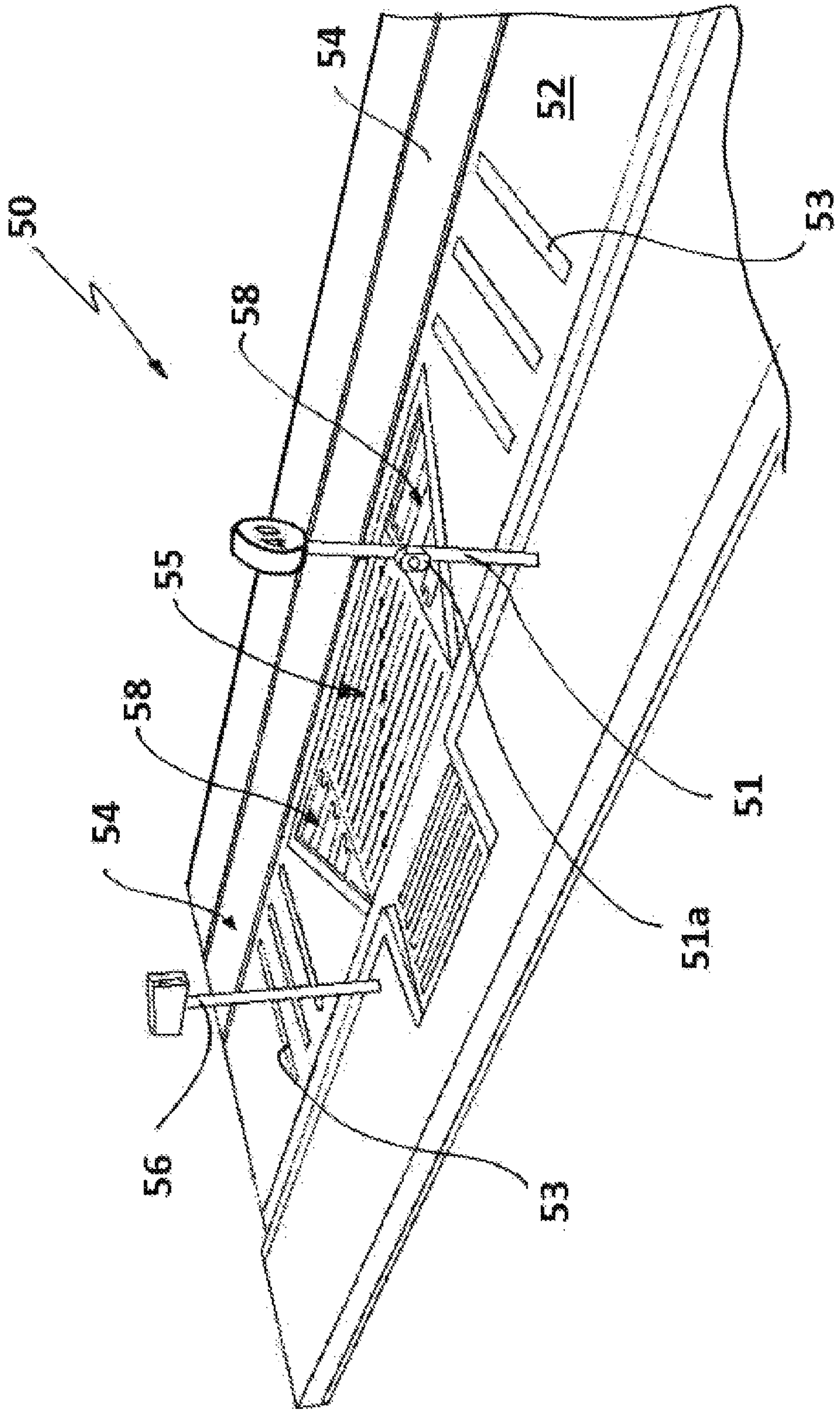
FIG. 10 is a perspective view of an access system in accordance with an embodiment of the present invention for facilitating access to a tram.
Figure 11:
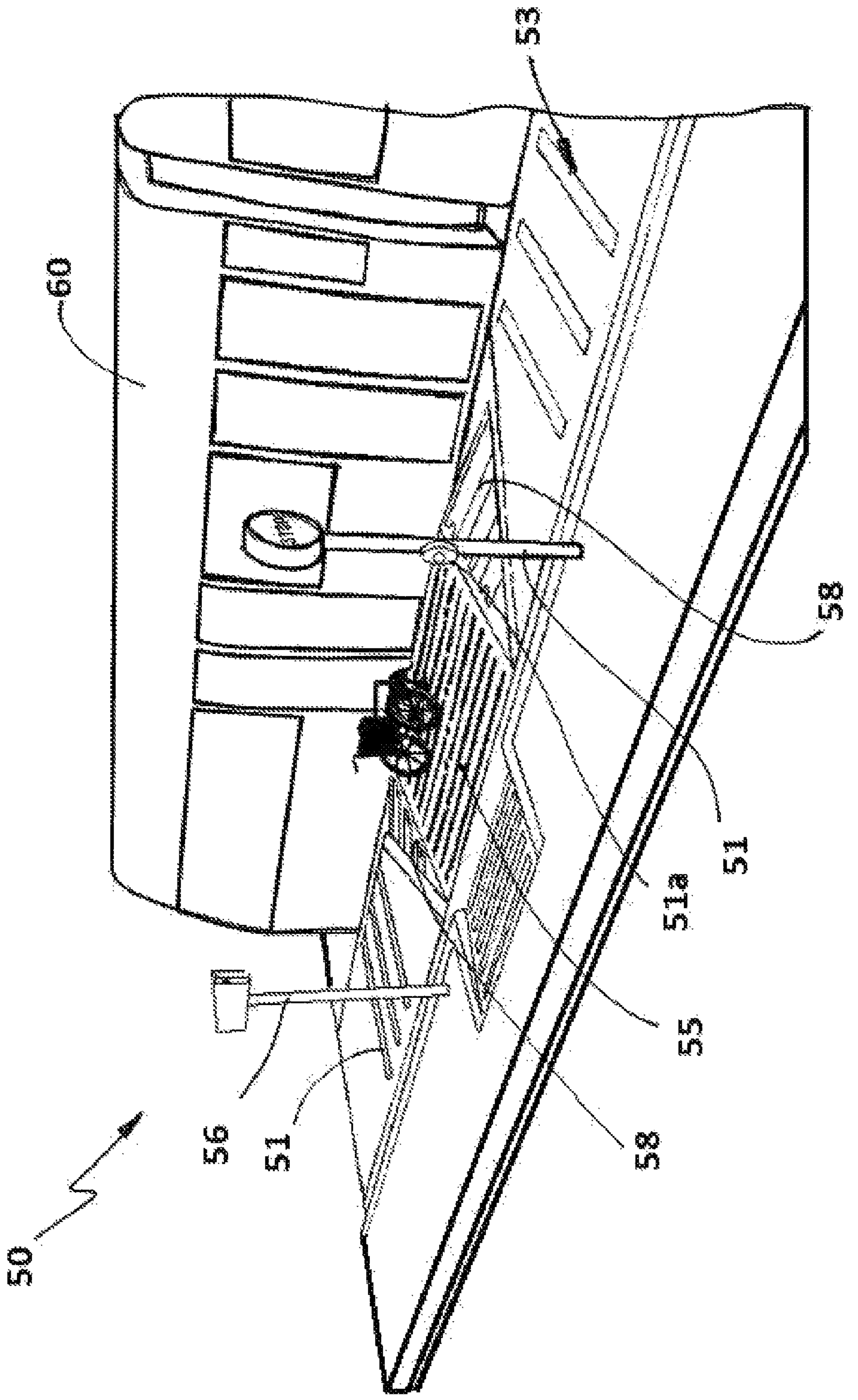
FIG. 11 is a perspective view of the access system of FIG. 10 in use.

As is shown in FIGS. 10 and 11, the access system 50 of the present invention can also be used in relation to light rail or tram applications. In such applications tram stops are integrated into a conventional roadside arrangement as shown in FIG. 10.

The tram stop is located adjacent a road 52 that accommodates general traffic in a conventional manner. Tracks 54 are provided along which the tram will travel. The access system 50 comprises a ramp 55, similar to that described above in relation to the train station application, which, when not in use, is located flush with the surface of the road 52. The surface of the road 52 is configured with signage 53 to dictate the zone in which traffic is not to enter when the tram is at a stop, as is well known in the art.

Additional warning signage 51 is also provided on the side of the road to provide further safety information which may be highlighted through the use of LEDs and the like. The signage 51 may comprise a button 51*a* that can be depressed by a passenger, such as a wheelchair passenger, who requires use of the ramp to access the tram. Upon depressing the button 51*a*, a signal will be transmitted to the tram to confirm that the ramp 55 will be activated upon arrival of the tram at the tram stop. The system will then receive a return signal from the tram to determine the type of tram approaching the tram stop to ensure that the ramp 55 will be activated to the desired height to provide smooth transit of the passenger onto the tram. A controller may be mounted in the button 51*a* to transmit and receive such signals. A camera 56 is also provided to monitor the access system 50 in use and can be configured to identify a wheelchair passenger awaiting the tram and automatically transmit signals to and from the tram to facilitate activation of the ramp 55 in the desired manner. It will be appreciated that, in the simplest form, the ramp 55 will activate every time the tram stops at the zone. In this regard, a sensor could be placed on the rail or road adjacent the rail to detect the presence of a tram approaching the stop, and may also detect whether the tram is slowing to stop at the zone. This can then trigger the ramp to be activated.

As is depicted more clearly in FIG. 11, the ramp 55 has side members 58 hingedly connected to the ramp 55 and the road 52 along sides of the ramp 55. The side members 58 are in the form of triangular shaped members that function to maintain coverage of the gap between the ramp 55 and the surface of the road 52 as the ramp is raised and lowered. The side members 58 are substantially planar members and are made from a durable material such that when they are in the lowered position, as shown in FIG. 10, the side members 58 can support traffic travelling thereon. When the ramp 55 is in the raised or activated position of FIG. 11, the side members provide a smooth transition between the sides of the ramp 55 and the surface of the road 52 to support a passenger travelling over the side members 58 to access the tram 60.

The flexible hinged connection between the side members 58 and the ramp 55 and road 52 ensures that, irrespective of the height in which the ramp 55 is elevated to, there is no gap present between the corresponding surfaces which may be a tripping hazard to passengers. The ramp 55 may be activated by a cam system as discussed above, or by any other suitable raising method, such that the ramp can be controlled to move between a lowered position that is flush with the surface of the road 52, and the elevated position as shown in FIG. 11.

It will be appreciated that in such an access system 50, wheel chair passengers located at a roadside tram stop can confidently await a tram knowing that when the tram arrives there will be smooth access via the ramp 55 to the tram. Similarly, road users will be able to use the road in a conventional manner and the tram driver will not be required to leave the tram to install a ramp, ensuring a more efficient process with minimal delays.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the system uppermost.

It will be appreciated by those skilled in the art that many modifications and variations may be made to the methods of the invention described herein without departing from the spirit and scope of the invention.

I claim:

1. An access system for providing passenger access to rolling stock at a designated stopping station, comprising:
- a dedicated zone for receiving the passenger, the dedicated zone being elevated above a ground surface;
- a ramp mounted within the dedicated zone and actuable to project from the dedicated zone in both a lateral extension and a vertical extension to bridge a gap between the dedicated zone and the rolling stock to facilitate access of the passenger to the rolling stock; and
- wherein the vertical extension of the ramp is achieved by rotating a cam member positioned under the ramp, the cam member having a body shaped to rotate between a substantially flat position where negligible angular elevation is provided, to a fully upright position where maximum angular elevation is provided.

2. A access system according to claim 1, wherein the dedicated zone has an elevated floor mounted upon a surface of the designated stopping station such that an edge of the elevated floor is located adjacent an edge of the designated stopping station.

3. An access system according to claim 1, further comprising a controller mounted within the dedicated zone, the controller having a receiver for receiving data identifying rolling stock approaching the designated stopping station.

4. An access system according to claim 3, wherein, the controller is configured to control the lateral and vertical extension of the ramp from the dedicated zone in accordance with the requirements of the identified rolling stock.

5. An access system according to claim 4, wherein the lateral extension of the ramp is controlled by one or more linear actuators mounted within the dedicated zone and attached to a rear of the ramp.

6. An access system according to claim 4, wherein the vertical extension of the ramp is controlled by controlling a degree of rotation of the cam member mounted beneath the ramp.

7. An access system according to claim 1, wherein the dedicated zone is positioned between barriers.

8. An access system according to claim 7, wherein the barriers comprise a lighting system controlled by the controller to provide a visual indication of the presence of the rolling stock at the designated stopping station.

9. An access system according to claim 1, wherein the designated stopping station is a train platform.

10. An access system according to claim 1, wherein the designated stopping station is a tram stop.

11. A method of providing passenger access to rolling stock at a designated stopping station, comprising:
- detecting the rolling stock approaching the designated stopping station;
- identifying the rolling stock and the access requirements for that rolling stock;
- activating a ramp to extend from the designated stopping station in both a lateral extension and a vertical extension to engage with the identified rolling stock to bridge a gap between the designated stopping station and the identified rolling stock to facilitate access of passengers to identified the rolling stock; and
- wherein the vertical extension of the ramp is achieved by rotating a cam member positioned under the ramp, the cam member having a body shaped to rotate between a substantially flat position where negligible angular elevation is provided, to a fully upright position where maximum angular elevation is provided.

12. A method according to claim 11, wherein the step of detecting the rolling stock approaching the designated stopping station comprises sensing the presence of the rolling stock travelling along the rail.

13. A method according to claim 11, wherein the step of identifying the rolling stock comprises sensing an identification code transmitted by the rolling stock approaching the dedicated stopping station.

14. A method according to claim 13, wherein the step of identifying the rolling stock also comprises determining the access requirements of the rolling stock.

15. A method according to claim 14, wherein the access requirements include data identifying a position of entry doors of the rolling stock.

16. A method according to claim 13, wherein the access requirements include data identifying a height of the entry doors of the rolling stock.

17. A method according to claim 15 wherein the step of activating the ramp comprises controlling the vertical and lateral extension of the ramp to accommodate the position and/or height of the entry door of the rolling stock.

18. A method according to claim 16 wherein the step of activating the ramp comprises controlling the vertical and lateral extension of the ramp to accommodate the position and/or height of the entry door of the rolling stock.

* * * * *